(12) United States Patent
Lackman et al.

(10) Patent No.: US 10,614,484 B2
(45) Date of Patent: Apr. 7, 2020

(54) OPTIMIZATION OF ELECTRONIC MEDIA CONTENT ITEM DELIVERY BASED ON PAST CLIENT INTERACTIONS

(71) Applicant: Facebook, Inc., Menlo Park, CA (US)

(72) Inventors: Andrew Lackman, Seattle, WA (US); Matthew Jesse Hartgraves, Edmonds, WA (US)

(73) Assignee: Facebook, Inc., Menlo Park, CA (US)

( * ) Notice: Subject to any disclaimer, the term of this patent is extended or adjusted under 35 U.S.C. 154(b) by 179 days.

(21) Appl. No.: 15/597,044

(22) Filed: May 16, 2017

(65) Prior Publication Data

US 2018/0336587 A1 Nov. 22, 2018

(51) Int. Cl.
*G06Q 30/02* (2012.01)

(52) U.S. Cl.
CPC ..... *G06Q 30/0244* (2013.01); *G06Q 30/0272* (2013.01)

(58) Field of Classification Search
None
See application file for complete search history.

(56) References Cited

U.S. PATENT DOCUMENTS

| 9,070,141 | B2 | 6/2015 | Hua et al. | |
|---|---|---|---|---|
| 9,317,812 | B2 | 4/2016 | Kabiljo et al. | |
| 2008/0040318 | A1* | 2/2008 | Stanis | G06Q 30/02 |
| 2010/0293047 | A1* | 11/2010 | Schwarz | G06Q 30/02 |
| | | | | 705/14.42 |
| 2011/0231240 | A1* | 9/2011 | Schoen | G06Q 30/0242 |
| | | | | 705/14.41 |
| 2012/0116872 | A1* | 5/2012 | Hicken | G06Q 30/0251 |
| | | | | 705/14.49 |
| 2012/0166532 | A1 | 6/2012 | Juan et al. | |
| 2012/0331063 | A1 | 12/2012 | Rajaram | |
| 2013/0014136 | A1* | 1/2013 | Bhatia | H04N 21/252 |
| | | | | 725/9 |
| 2014/0156360 | A1 | 6/2014 | Shalita et al. | |
| 2014/0279056 | A1* | 9/2014 | Sullivan | G06Q 30/0275 |
| | | | | 705/14.71 |

(Continued)

OTHER PUBLICATIONS

"Engagement Rate: A Metric You Can Count On" (published online at https://www.socialbakers.com/blog/1427-engagement-rate-a-metric-you-can-count-on on Feb. 25, 2013) (Year: 2013).*

*Primary Examiner* — James M Detweiler
(74) *Attorney, Agent, or Firm* — Fenwick & West LLP

(57) ABSTRACT

An online system receives related content items from a content provider for delivery over a period of time. The system determines a rate of delivery of each related content item to users of the online system. The system delivers the related content items based on the determined rates of delivery. The system monitors a rate of client interactions with the related content items. The system adjusts the rate of delivery of each related content item based on the rate of client interactions associated with the related content item, such that higher performing related content is delivered more than lower performing related content. If the rate of delivery of the related content item decreases below a threshold, the system sets the adjusted rate of delivery of the related content item to the threshold. The system delivers the related content items to client devices based on the adjusted rates of delivery.

19 Claims, 4 Drawing Sheets

(56) References Cited

U.S. PATENT DOCUMENTS

| | | | |
|---|---|---|---|
| 2015/0331553 A1* | 11/2015 | Shaffer | G06F 3/013 |
| | | | 715/765 |
| 2016/0092929 A1* | 3/2016 | Huang | G06Q 30/0269 |
| | | | 705/14.66 |
| 2018/0053205 A1* | 2/2018 | Qin | G06Q 30/0277 |

* cited by examiner

OPTIMIZATION OF ELECTRONIC MEDIA CONTENT ITEM DELIVERY BASED ON PAST CLIENT INTERACTIONS

BACKGROUND

This disclosure relates generally to providing electronic media content items to client devices and in particular to optimization of electronic media content item delivery to an online audience based on past client interactions.

Content providers, content publishers, and social networks often present content items to users. Such content items are viewed by users on client devices, for example, a laptop or a mobile device. A content item may include text, images, audio clips, links, etc. Users typically interact with content items by clicking on them, sharing them with other users, commenting on them, etc., on a client device. The client experience provided by a content item and the feedback to the content provider from client interactions often depends on the choice of content item presented to the user. For example, a content item describing a particular topic may be well received at some time but may provide a poor user experience when presented at a different time.

Content providers often provide a set of a few related content items for delivery to users, and generally indicate a total number of times this related content should be delivered. Conventional techniques for presenting these related content items often send each content item to the client devices of users without consideration of whether users are engaging more with certain ones over the others. Instead, they provide all of the content items of the content provider to the users at equal rates.

SUMMARY

Embodiments relate to delivering related content items of a given content provider to users of an online system in a manner that considers which of the content items the users are interacting based on more, and optimizes delivery such that these higher interactions items are delivered to users at a higher rate. An online system receives a set of related content items (e.g., from a particular content campaign) from a given content provider and delivers them to client devices of users of the online system. Examples of content items are electronic text, images, audio clips, links, etc. In some embodiments, the content provider indicates in some manner generally a total number of times content from the set should be delivered. The online system determines a rate of delivery of each of the content items to client devices of users of the online system. The rate of delivery is related to the number of times a content item is presented to the client devices of users of the online system during a time interval. The online system delivers the content items to client devices of users and monitors client interactions with or related to the delivered content items. For example, the online system monitors client interactions including clicking on a link in a content item, filling out an online form, closing the content item using a "close window" button on the client device, taking an action later based on having viewed the content item, etc. The online system determines a rate of client interactions based on the monitored client interactions.

The online system adjusts the rate of delivery of each of the content items in the set based on the monitored rate of client interactions with the content item, and can continue to adjust dynamically over time since performance of a content item may change over time. In an embodiment, the online system sets the rate of delivery of a content item to a value proportionate to the monitored rate of client interactions with the content item if the monitored rate of client interactions is above a threshold value. The online system sets the rate of delivery of the content item to a threshold rate of delivery if the monitored rate of client interactions is below the threshold rate of client interactions. The threshold rate of delivery is a lower limit on the rate of delivery of the content items such that all of the content items are shown at least once in a while (none have a rate of delivery of zero). The online system delivers the content items to client devices based on the adjusted rates of delivery.

In one embodiment, the online system adjusts the rate of delivery of each of the content items based on the rate of client interactions to a second threshold rate of delivery if the rate of client interactions is above a second threshold rate of client interactions. The second threshold rate of delivery provides an upper limit on the rate of delivery of the content items.

In one embodiment, the online system determines the threshold rate of delivery as a value inversely proportionate to the number of content items in the content items. For example, if a large number of content items are being delivered by the online system, the online system selects a low threshold rate of delivery.

Thus, instead of delivering all content items in the set at the same rate to users such that each content item is delivered about the same number of times, the system dynamically adjusts the delivery based on interactions relating to the content items over time. However, the system avoids having delivery of any of the content items drop to zero or having any one content item take over too much of the delivery as performance may chance over time or users may tire of certain content items over time.

BRIEF DESCRIPTION OF THE DRAWINGS

The teachings of the embodiments can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
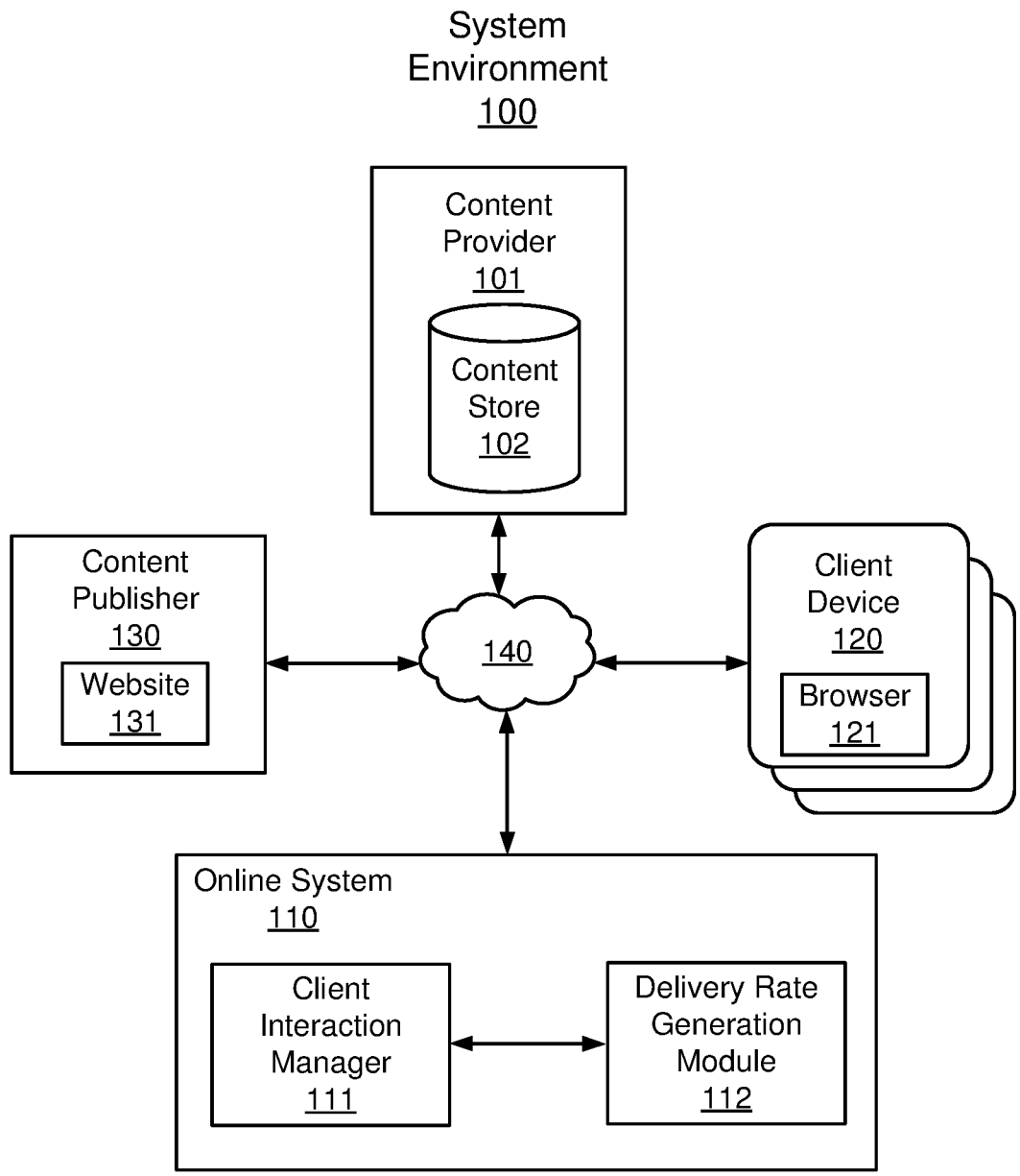
FIG. 1 is a block diagram of a system environment in which the online system operates, in accordance with an embodiment.

FIG. 1 is a block diagram of a system environment 100 in which an online system 110 operates, in accordance with an embodiment. The system environment 100 shown in FIG. 1 includes a content provider 101, the online system 110, client devices 120, a content publisher 130, and a network

140. The content provider 101 includes a content store 102 for storing content items. The content publisher 130 includes a website 131 for delivering content items to users via client devices 120.

The content provider 101 shown in FIG. 1 provides electronic media content items to the online system 110 for delivering to the client devices 120 and a website 131 of the content publisher 130. The content provider 101 may be a provider of sponsored content such as a political campaign, a university, a corporation, the government, etc. Sponsored content includes content items for which the content provider 101 provides remuneration to the online system for delivery of the content items to an online audience via the client devices 120 and the website 131 of the content publisher 130. The term "content item" refers to "electronic media content item" wherever it appears herein. Content items may be images, text paragraphs, video clips, audio clips, hyperlinks, online forms, etc. Examples of sponsored content include online advertisements.

The content provider 101 shown in FIG. 1 may provide more than one content item to the online system 110 for delivering to users. In one example the content provider 101 provides more than one content item for the purpose of building brand awareness to the online system 110 or for a particular content campaign. In one example, the content provider 101 provides more than one content item for the purpose of delivering hyperlinks to client devices for transactions to be performed by users of the online system 110. The content provider 101 may specify policies or weights for each content item to the online system 110 regarding delivering of the content item to the client devices 120 and the website 131 of the content publisher 130, as described below in detail with reference to FIG. 2. A policy specifies constraints associated with delivering of a content item, for example, constraints that must be satisfied by delivering of a content item and constraints that should not be satisfied by delivering of a content item. In addition, the content provider 101 may specify a policy regarding all content items to the online system 110 regarding delivering of all the content items to the client devices 120 and the website 131 of the content publisher 130. The content provider 101 may specify a weight for each content item, the weight indicative of a significance of the content item. For example, if the content item describes a product or service, the weight of the content item may indicate the value of the product or service.

The content store 102 shown in FIG. 1 is used to store content items by the content provider 101 for sending to the online system 110. The content store 102 may be organized as a database, table, file, etc., stored on one or more of removable or non-removable memory cards, tape cassettes, zip cassettes, and computer hard drives. The content store 102 may include multiple data fields, each describing one or more attributes of the content items. The content store 102 may include, for a single content item—a content provider identifier (e.g., whether the content item is provided by the government), a list of policies and one or more weights regarding delivering of the content item to the client devices 120 and the website 131 of the content publisher 130, one or more threshold rates of client interactions, a list of desired client interactions, such as clicking on a link in a content item, closing a content item using a close button on a browser of a client device, sharing a content item from a first client device to a second client device, performing a transaction associated with a content item, and so on. The content store 102 may also store for all content items—the number of content items to be delivered in a given time interval, a length of a time interval during which the content items are expected to be delivered, an estimate of a total number of deliveries of content items during the time interval, and so on. For example, the content publisher 130 may set a budget for an advertising campaign including content item deliveries, and the content publisher 130 may indicate a number of impressions for each content item. A delivery of a content item refers to an instance of a particular content item being delivered to a user. For example, if the same content item is delivered to multiple users or multiple times to the same user, each instance is referred to as a delivery.

The online system 110 shown in FIG. 1 includes a client interaction manager 111 and a delivery rate generation module 112. The client interaction manager 111 receives data packets representing client interactions with content items delivered to client devices 120 and the website 131 of the content publisher 130 by the online system 110 and monitors a rate of client interactions with each of the content items in response to the online system 110's delivering the content items to client devices of client devices 120 and the website 131 of the content publisher 130, as described below in detail with reference to FIG. 2. The delivery rate generation module 112 determines a rate of delivery of each of the content items to client devices 120 and the website 131 of the content publisher 130 by the online system 110, as described below in detail with reference to FIG. 2. The delivery rate generation module 112 further adjusts the rate of delivery of each of the content items based on the client interaction manager 111 monitoring the rate of client interactions with the content item, as described below in detail with reference to FIG. 2. The delivery rate generation module 112 sets the rate of delivery of a content item to a value proportionate to the monitored rate of client interactions with the content item if the monitored rate of client interactions is above a threshold rate of client interactions. The delivery rate generation module 112 sets the rate of delivery of the content item to a threshold rate of delivery if the monitored rate of client interactions is below the threshold rate of client interactions. The online system 110 delivers the content items to client devices 120 and the website 131 of the content publisher 130 by the online system 110 based on the adjusted rates of delivery.

The client devices 120 shown in FIG. 1 are used by user of the online system 110 for interacting with the online system 110 and the website 131 of the content publisher 130. Each client device 120 is a computing device capable of receiving client input as well as transmitting and/or receiving data via the network 140. The client device 120 may be a conventional computer system, such as a desktop or laptop computer. Alternatively, the client device 120 may be a device having computer functionality, such as a personal digital assistant (PDA), a mobile telephone, a smartphone or another suitable device. The client device 120 may execute an application allowing a user of the online system 110 to interact with the online system 110 and/or the website 131 of the content publisher 130. In one example, the client device 120 executes a browser application 121 to enable interaction between the client device 120 and the online system 110 via the network 140. In one example, the client device 120 interacts with the website 131 of the content publisher 130 through an application programming interface (API) running on a native operating system of the client device 120, such as IOS® or ANDROID™. A user may download content items from the online system 110 to the client device 120 using browser 121 and interact with the content items by clicking on a link in a content item, filling in client information into an online form, closing the content item using a "close window" button on the browser 111 or on the client device 120, etc.

The content publisher 130 may be a digital publisher of newspapers, e-books, digital magazines, digital libraries, catalogues, etc., such as an online newspaper, university, corporation, etc. The content publisher 130 can be any website that provides content to users. The content publisher 130 may distribute content including web pages, videos, and text, for example, books, magazines, and newspapers to users through tablet reading devices, distribution via the Internet (in the form of the web site 131 accessible by the client devices 120), other interactive media, etc. The website 131 is a collection of related web pages, including multimedia content, typically identified with a common domain name, and published on at least one web server. The website 131 may be accessible via a public Internet Protocol (IP) network, such as the Internet, or a private local area network (LAN), by referencing a uniform resource locator (URL) that identifies the site. The website 131 can have many functions and can be used in various fashions—a personal website, a commercial website for a company, a government website, a non-profit organization website, website for entertainment, social networking system, a website providing news or educational content, private website such as a company's website for its employees typically a part of an intranet, etc.

The content provider 101, content publisher 130, client devices 120, and the online system 110 are configured to communicate via the network 140 shown in FIG. 1, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 110 as disclosed provides benefits and advantages that include increased engagement of users with content items. Other advantages of the system include efficient delivery of content to users by eliminating delivery of content items in cases where users are unlikely to interact with the content items, faster processing of the online system since fewer content items are transmitted, less power consumption, lower latency in content transmission, less data transmitted over the network, etc.

System Architecture

Figure 2:
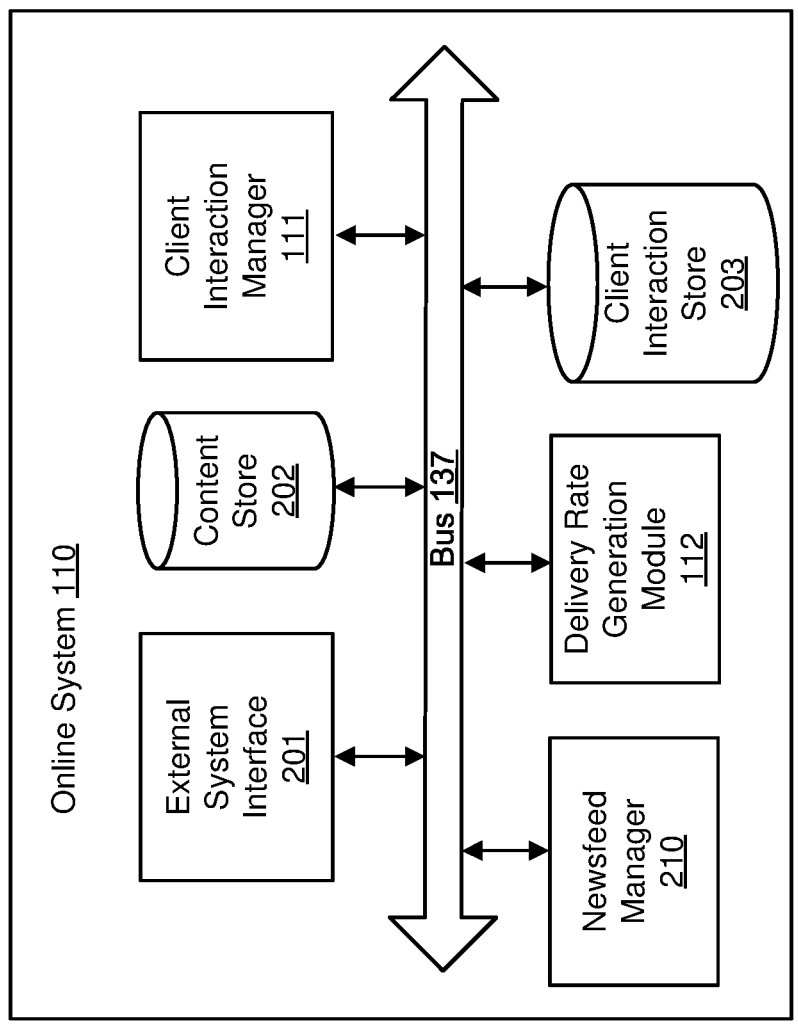
FIG. 2 is a block diagram of a system architecture of the online system, in accordance with an embodiment.

The online system 110 shown in FIG. 2 includes an external system interface 201, a content store 202, a client interaction manager 111, a client interaction store 203, a newsfeed manager 210, and a delivery rate generation module 112. The external system interface 201 shown in FIG. 2 is a dedicated hardware networking device or software module that receives data packets representing a content item from the content provider 101 and data packets representing a client interaction with a content item from a client device 120 or a website 131 of the content publisher 130 in response to displaying a tracking pixel on the browser 121 of the client device 120. The external system interface 201 forwards data packets representing a content item and a tracking pixel to the client devices 120 as well as to the website 131 of the content publisher 130. The external system interface 201 may forward data packets at high speed along the optical fiber lines of the Internet backbone. The external system interface 401 may exchange routing information using the border gateway protocol (BGP) and may be an edge router, a border router, or a core router.

The content store 202 shown in FIG. 2 is used to store content items by the online system 101 for sending to the client devices 120 as well as to the website 131 of the content publisher 130. The content store 202 may be organized as a database, table, file, etc., stored on one or more of removable or non-removable memory cards, tape cassettes, zip cassettes, and computer hard drives. The content store 202 may include multiple data fields, each describing one or more attributes of the content items. The content store 202 may include, for a single content item—a content provider identifier (e.g., whether the content item is provided by the government), a list of policies and one or more weights regarding delivering of the content item to the client devices 120 and the website 131 of the content publisher 130, one or more threshold rates of client interactions, a list of desired client interactions, such as clicking on a link in a content item, closing a content item using a close button on a browser of a client device, sharing a content item from a first client device to a second client device, performing a transaction associated with a content item, etc., and for all content items—the number of content items, a length of a time interval during which the content items are expected to be delivered, an estimate of a total number of deliveries of content items during the time interval, etc.

The client interaction manager 111 shown in FIG. 2 receives data packets representing client interactions with content items presented to the client devices 120 and the website 131 of the content publisher 130 via the external system interface 201 and populates the client interaction store 203 with information about client interactions. In one embodiment, the online system 110 makes tracking pixel code available to third-party websites 131, such that the websites 131 can install these tracking pixels on pages on their websites. When a user visits a webpage on one of these third-party websites 131, the user's browser 121 loads the page and attempts to load the content in the tracking pixel, which causes the browser 121 to send a request to the online system 110 for content. In the request, the browser 121 sends information related to the user's actions on the website 131, e.g., what page the user is loading—a shopping cart page, a purchase confirmation page, etc. The content publisher 130 can include other information they want to send to the online system 110 about the user's action. The online system 110 provides a content item related to a product on a website of the online system 110 or elsewhere and tracks whom the content item was sent to. When a user goes to the website 131 and loads the purchase confirmation page for the product, the tracking pixel sends information to the online system 110; this information is tracked as a conversion.

In one embodiment, when the online system 110 delivers content items to the client devices 120 and the website 131 of the content publisher 130, it may include tracking pixels with the content items such that when a content item is presented via the browser 121 of the client device 120, a particular program or code (or set of instructions) is executed by the browser 121. This code, associated with a tracking pixel, causes a request to be sent to the online system 110, for example, to the client interaction manager 111. In an embodiment, the request sent as a result of execution of the code includes parameters, for example, a browser identifier associated with the client or other values associated with the web page displayed by the client device. A tracking pixel may be a transparent 1×1 image, an iframe, or other suitable client interface object. The client interaction manager 111 stores information describing client interactions in the client interaction store 203. The client interaction store 203 stores the values received as a result of the request, for example, the browser identifier associated with the client obtained from the client application, information describing the client interaction performed, and a time stamp value indicating the time at which the client interaction was performed.

In one embodiment, the content publisher 130 uses a tracking pixel or piece of HTML code placed by the content publisher on third-party websites 131 to monitor users visiting the websites 131 that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser 121 loads a page having the tracking pixel, the tracking pixel results in the user's browser 121 attempting to retrieve the content for that pixel, and the browser contacts the online system 110 to retrieve the content. The request sent to the online system 110, however, actually includes various data about the user's actions taken on the third party website 131. The third party website 131 can control what data is sent to the online system 110. For example, the third party system may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 110 can also be retrieved by the online system 110, which can include various data about the user, such as the online systems' UID for the user, information about the client device 120 and the browser 121, such as the Internet Protocol (IP) address of the client device 120, among other data. Tracking can also be performed on mobile applications of content providers 101 by using a software development kit (SDK) of the online system 110 or via an application programming interface (API) of the online system 110 to track events (e.g., purchases) that occur by users on the content provider's app that are reported to the online system 110.

The online system 110 can then use this data received about the user to serve better content to the user in the future (e.g., since the online system 110 has further data about products purchased or browsed that might be of interest), and can also use this in retargeting of that product to the user (e.g., where the user went to the product page on the third party site 131 by clicking on a content item of the third party presented to the user in the online system 110). The online system 110 can also use this data in conversion tracking and reporting results of advertising campaigns to the third party. For example, if the third party has spent money at the online system 110 to have the online system 110 serve content items for its products, and a particular user views an ad on the online system 110 and then purchases the product advertised (possibly at some point later, and possibly on a different device 121), the online system 110 can link the purchase/conversion to the content item originally shown on the online system 110. Thus, the online system 110 can include this data in its reporting to the third party system of how many conversions the ad campaign received.

The client interaction store 203 shown in FIG. 2 may include client interactions, such as clicking on a link in a content item, filling in user information into an online form, closing the content item using a "close window" button on the client device 120, sharing a content item by sending it to another user who is connected to the first client's online account, commenting on posts linked to a content item, checking-in to physical locations linked to a content item via a mobile device, joining an event linked to a content item to a calendar, joining a user group linked to a content item, expressing a preference for a content item, e.g., "liking" the content item, engaging in a transaction linked to a content item, converting on or purchasing a product or service advertised in the content item, etc. If the online system 110 is a social networking system, the online system 110 uses the data from the client interaction store 203 to infer interests or preferences of a user, augmenting the interests included in a client profile of the user, and building a comprehensive set of user preferences for content items. A user of the online system 110 may interact with content items, and that interaction may be reported to connections of the user in the social networking system via a newsfeed or other mechanism for providing information to users.

The delivery rate generation module 112 shown in FIG. 2 determines a rate of delivery $R_C$ of each content item C to client devices 120 and the website 131 of the content publisher 130 for the online system 110 to deliver the content item C to client devices 120 of users of the online system 110 based on the determined rate of delivery $R_C$. The rate of delivery $R_C$ of each content item C may represent the number $D_C$ of times content item C is delivered to client devices 120 and the website 131 of the content publisher 130 by the online system 110 during a time interval of length T. In one example, the total number of deliveries of all content items requested by the content provider 101 is represented by N. The total number of deliveries N may be determined based on a remuneration, which the content provider 101 provides to the online system 110 for delivering the content items to the client devices 120 and the website 131 of the content publisher 130.

In an embodiment, the delivery rate generation module 112 determines the rate of delivery $R_C$ of each content item C to client devices 120 and the website 131 of the content publisher 130 as $R_C = N/(M \times T)$, where M represents the number of content items. As an example, if the total number of deliveries of all content items requested by the content provider 101 represented by N equals 10,000 and the number of content items represented by M equals 100, then the number of times content item C is delivered to client devices 120 and the website 131 of the content publisher 130 may be determined as $D_C = N/M = 10,000/100 = 100$. The rate of delivery $R_C$ of each content item C to client devices 120 and the website 131 of the content publisher 130 may be determined by the delivery rate generation module 112 as $R_C = D_C/T = 10,000/(100 \times 10) = 10$, where the length T of the first time interval for delivery equals 10 days. In this example, content item C may be delivered 10 times a day to client devices 120 and the website 131 of the content publisher 130.

In one embodiment, the delivery rate generation module 112 shown in FIG. 2 determines the rate of delivery $R_C$ of each content item C to client devices 120 and the website 131 of the content publisher 130 as a ratio of the number $D_C$ of times content item C is delivered relative to the total number of deliveries of all content items requested by the content provider 101, represented by N. As an example, if N=10,000, M=100 represents the number of content items, and each content item C is delivered an equal number of times, content item C will be delivered $D_C$=N/M=10,000/100=100 times. In this example, $R_C$ is determined as $D_C$/N=100/10,000=0.01. If $R_C$ equals 0.7 and N=10,000, the content item C is delivered $D_C$=7,000 times.

In one embodiment, the rate of delivery may be a number of impressions of a content items. When a content item is displayed on a third-party website external to the online system 110, the user's browser (when loading the third-party webpage) may send a message to the online system 110 to retrieve the content item. The online system 110 may then provide the content item to the client device. In other embodiments, delivery of a content item to users may include delivery of the content item to a content publisher who then delivers the content item to users.

The online system 110 shown in FIG. 2 delivers each content item C to client devices 120 and the website 131 of the content publisher 130 based on the determined rate of delivery $R_C$, and the client interaction manager 111 monitors a rate of client interactions $I_C$ with each content item C in response to the delivery. The rate of client interactions $I_C$ with each content item C may be determined by the client interaction manager 111 as a ratio of the number $P_C$ of client interactions with content item C to the number $D_C$ of deliveries of content item C: $I_C = P_C/D_C$. If the number $D_C$ of deliveries of content item C equals 100 and the number $P_C$ of client interactions with content item C equals 70, the rate of client interactions $I_C$ with each content item C may be determined as $I_C = P_C/D_C = 70/100 = 0.7$. The rate of client interactions $I_C$ with each content item C may be determined by the client interaction manager 111 as a ratio of the number $P_C$ of client interactions with content item C to the length T of the first time interval for delivery: $I_C = P_C/T$. If the number $P_C$ of client interactions with content item C equals 70 and the length T of the time interval for delivery equals 10 days, the rate of client interactions $I_C$ with each content item C may be determined as $I_C = P_C/T = 70/10 = 7$.

In alternative embodiments, the client interaction manager 111 shown in FIG. 2 may monitor the rate $I_C$ of client interactions with a content item C by determining a weighted aggregate of rates of distinct client interactions with the content item C. The number of distinct client interactions with content item C may be represented as $P_{C1}$, $P_{C2}$, $P_{C3}$, $P_{C4}$, etc. $P_{C1}$ may represent the number of times a user closed a content item C using a close button on a browser of a client device during the first time interval. $P_{C2}$ may represent the number of times a user clicked on a link in a content item C during the first time interval. $P_{C3}$ may represent the number of times a user shared a content item C from a first client device to a second client device during the first time interval. $P_{C4}$ may represent the number of times a user performed a transaction associated with a content item C during the first time interval. The rates of distinct client interactions with the content item C may be represented by $I_{C1} = P_{C1}/T$, $I_{C2} = P_{C2}/T$, $I_{C3} = P_{C3}/T$, $I_{C4} = P_{C4}/T$, etc. The client interaction manager 111 may determine the rate $I_C$ of client interactions with content item C as a weighted aggregate of rates of distinct client interactions with the content item C: $I_C = A_1 \times I_{C1} + A_2 \times I_{C2} + A_3 \times I_{C3} \pm A_4 \times I_{C4}$. Here, $A_1$, $A_2$, $A_3$, and $A_4$ represent the weights applied to the rates of distinct client interactions with the content item C. For example, the rate $I_{C2}$ of clicking on a link in a content item C may be weighted more than the rate $I_{C1}$ of closing the content item C using a close button on a browser of a client device, such that $A_2$ is greater than $A_1$. The rate $I_{C3}$ of sharing a content item C from a first client device to a second client device may be weighted more than the rate $I_{C2}$ of clicking on a link in the content item C, such that $A_3$ is greater than $A_2$. The rate $I_{C4}$ of performing a transaction associated with a content item C may be weighted more than the rate $I_{C3}$ of sharing a content item C from a first client device to a second client device, such that $A_4$ is greater than $A_3$. The client interaction manager 111 may determine the rate $I_C$ of client interactions with content item C as a weighted aggregate $\Sigma_Q A_Q \times I_{CQ}$.

The delivery rate generation module 112 shown in FIG. 2 adjusts the rate of delivery $R_C$ for each content item C for a second time interval occurring after the first time interval, based on the monitored rate of client interactions $I_C$ during the first time interval to maximize the total number of client interactions over all content items: $\Sigma_C I_C$ in the second time interval. The delivery rate generation module 112 sets the rate of delivery $R_C$ for each content item C to a value proportionate to the monitored rate of client interactions $I_C$ with the content item C if the monitored rate of client interactions $I_C$ is above a threshold rate of client interactions $I_T$. In one example, if the monitored rate of client interactions $I_C$ with a content item C equals 0.7 and the threshold rate of client interactions $I_T$ equals 0.5, the delivery rate generation module 112 may set the rate of delivery $R_C$ for content item C to 0.7. The threshold rate of client interactions $I_T$ can be the same for each content item C or different per content item C. The purpose of setting the rate of delivery $R_C$ for each content item C to a value proportionate to the monitored rate of client interactions $I_C$ is for delivering those content items more often during the second time interval that received more client interactions during the first time interval and for delivering those content items less often during the second time interval that received fewer client interactions during the first time interval to maximize the total number of client interactions over all content items: $\Sigma_C I_C$ in the second time interval.

The delivery rate generation module 112 shown in FIG. 2 sets the rate of delivery $R_C$ for each content item C to the threshold rate of delivery $R_T$ if the monitored rate of client interactions $I_C$ is below the threshold rate of client interactions $I_T$. In an example, if the threshold rate of delivery $R_T$ equals 0.3, the monitored rate of client interactions $I_C$ equals 0.1, and the threshold rate of client interactions $I_T$ equals 0.3, the delivery rate generation module 112 sets the rate of delivery $R_C$ for the content item C to the threshold rate of delivery $R_T$=0.3. The threshold rate of delivery $R_T$ specifies a delivery rate floor for the content items, which represents a lower limit on the rate of delivery $R_C$. The purpose of setting the rate of delivery $R_C$ for content item C to the threshold rate of delivery $R_T$, greater than zero, if the monitored rate of client interactions $I_C$ is below the threshold rate of client interactions $I_T$ is to ensure that content items having lower rates of client interactions continue to be delivered a minimum number of times to the client devices 120 and the website 131 of the content publisher 130. This prevents a "winner takes all" or "winner takes most" results in which the rate of delivery $R_C$ for content item C having a high rate of client interactions increases for every subsequent time interval, such that other content items are prevented from delivery. Furthermore, setting the rate of delivery $R_C$ for content item C ensures that the content item continues to be delivered at a minimum threshold rate even if user interactions with the content item are low. As a result, if factors affecting the user interactions change over time resulting in increase in user interest in the content item, the content item continues to be presented to the user, thereby allowing users to show their interest by interacting with the content item. As a result, the rate of delivery of the content item has a chance to increase. If the delivery of content item was stopped due to lack of user interactions with the content item, the online system is unable to determine if the interest level in the content item changes over time, since there will be no delivery of the content item to measure the user interactions.

In one example, the total number of deliveries of all content items requested by the content provider 101 represented by N equals 10,000 during the first interval and the number of content items represented by M equals 100. The delivery rate generation module 112 may determine the number of times content item C is delivered during the first time interval as $D_C$=N/M=10,000/100=100. The rate of delivery $R_C$ of content item C may be determined by the delivery rate generation module 112 as $R_C$=$D_C$/T=10,000/(100×10)=10, where the length T of the first time interval for delivery equals 10 days. In this example, the number $P_C$ of client interactions with content item C during the first time interval may be 10. The client interaction manager 111 may determine the rate of client interactions $I_C$ with content item C as $I_C$=$P_C$/T=10/10=1. In this example, the threshold rate of client interactions $I_T$ may be 3 and the threshold rate of delivery $R_T$ may be 2. The delivery rate generation module 112 sets the rate of delivery $R_C$ for content item C during the second time interval to the threshold rate of delivery $R_T$=2 because the monitored rate of client interactions $I_C$ equals 1 and is below the threshold rate of client interactions $I_T$=3. The online system 110 delivers the content items to the client devices 120 and the website 131 of the content publisher 130 during the second time interval based on the adjusted rates of delivery.

In alternative embodiments, the delivery rate generation module 112 shown in FIG. 2 may set the rate of delivery $R_C$ for each content item C to a second threshold rate of delivery $R_{T2}$ if the monitored rate of client interactions $I_C$ is above a second threshold rate of client interactions $I_{T2}$. In an example, if the second threshold rate of delivery $R_{T2}$ equals 0.7, the monitored rate of client interactions $I_C$ equals 0.9, and the second threshold rate of client interactions $I_T$ equals 0.7, the delivery rate generation module 112 sets the rate of delivery $R_C$ for the content item C to the second threshold rate of delivery $R_{T2}$=0.7. The second threshold rate of delivery $R_{T2}$ specifies a delivery rate ceiling for the content items, which represents an upper limit on the rate of delivery $R_C$. The purpose of setting the rate of delivery $R_C$ for content item C to the second threshold rate of delivery $R_{T2}$ if the monitored rate of client interactions $I_C$ is above the second threshold rate of client interactions $I_{T2}$ is to ensure that content items having higher rates of client interactions do not saturate the content item deliveries to the client devices 120 and the website 131 of the content publisher 130. This prevents a "winner takes all" or "winner takes most" results in which the rate of delivery $R_C$ for content item C having a high rate of client interactions increases for every subsequent time interval, such that other content items are prevented from delivery. In embodiments, the second threshold rate of delivery $R_{T2}$ is higher than the first threshold rate of delivery $R_T$.

In embodiments, the delivery rate generation module 112 shown in FIG. 2 may determine the threshold rate of delivery $R_T$ for each content item C as a value inversely proportionate to the number of content items M, such that $R_T$=f(1/M). The purpose of determining the threshold rate of delivery $R_T$ as a value inversely proportionate to the number of content items M is that as the number of content items M increases, the total number of deliveries of all content items requested by the content provider 101 represented by N may not change. As a result, each individual content item C may be delivered a fewer number of times $D_C$ to the client devices 120 and the website 131 of the content publisher 130. A high threshold rate of delivery $R_T$ for some content items may result in the online system 110 being unable to deliver other content items without exceeding the total number of deliveries of all content items requested by the content provider 101 represented by N. For example, if the total number of deliveries of all content items requested by the content provider 101 represented by N equals 10,000, the number of content items represented by M equals 100, the length T of the time interval for delivery equals 10 days, and the threshold rate of delivery $R_T$ for each content item C is 5, each content item C must be delivered at least 5 times a day. If the number of content items represented by M increases to 200 and the threshold rate of delivery $R_T$ for each content item C remains at 5, there will be a minimum number of 5×200=1,000 content item deliveries a day. Over T=10 days, the total number of deliveries of all content items requested by the content provider 101 represented by N equaling 10,000 will be met. However, the online system will be unable to deliver any content item C at a higher rate than the minimum threshold rate of delivery $R_T$ without exceeding the total number of deliveries of all content items requested by the content provider 101 represented by N.

In alternative embodiments, the online system 100 shown in FIG. 2 may receive a measure of length of a time interval T during which the content items are expected to be delivered. The online system 100 may receive an estimate of the total number of deliveries N of content items during the time interval. The delivery rate generation module 112 shown in FIG. 2 may determine the threshold rate of delivery $R_T$ based on the length of the time interval and the total number of deliveries of content items as $R_T$=f(T, N). The delivery rate generation module 112 may determine the threshold rate of delivery $R_T$ based on a ratio of the total number N of deliveries of content items and the length of the time interval T: $R_T$=f(N/T). The delivery rate generation module 112 may determine the threshold rate of delivery $R_T$ based on a ratio of the total number N of deliveries of content items and the length of the time interval T because as the total number N of deliveries of content items increases, each content item C may be delivered a greater number of times $D_C$.

For example, if the total number of deliveries of all content items requested by the content provider 101 represented by N equals 10,000, the number of content items represented by M equals 100, the length T of the time interval for delivery equals 10 days, and the threshold rate of delivery $R_T$ for each content item C is 5, each content item C must be delivered at least 5 times a day, such that if each content item C is delivered at the threshold rate of delivery $R_T$=5, the minimum number of deliveries will be 5×100=500 content item deliveries a day. Over T=10 days, the minimum total number of deliveries of all content items will equal 10×500=5,000, half the total number of deliveries of all content items (10,000). If the total number of deliveries of all content items N increases to 20,000 and the threshold rate of delivery $R_T$ for each content item C remains at 5, there will be a minimum number of 5×100=500 content item deliveries a day. Over T=10 days, the total number of deliveries of all content items requested will equal 5,000, a quarter of the total number of deliveries of all content items (20,000). The threshold rate of delivery $R_T$ for each content item C can increase to 10 such that the minimum total number of deliveries of all content items equals 10×100=1,000 per day and 10,000 over T=10 days, again half the total number of deliveries of all content items (20,000).

The delivery rate generation module 112 shown in FIG. 2 may determine the threshold rate of delivery $R_T$ based on a ratio of the total number N of deliveries of content items and the length of the time interval T because as the length of the time interval T increases, each content item C may be delivered a fewer number of times $D_C$. A high threshold rate of delivery $R_T$ for some content items may result in the online system 110 being unable to deliver other content items without exceeding the total number of deliveries of all content items requested by the content provider 101 represented by N. For example, if the total number of deliveries of all content items requested by the content provider 101 represented by N equals 10,000, the number of content items represented by M equals 100, the length T of the time interval for delivery equals 10 days, and the threshold rate of delivery $R_T$ for each content item C is 5, each content item C must be delivered at least 5 times a day, resulting in a minimum of 50 deliveries over T=10 days. If the length T of the time interval for delivery increases to 20 days and the threshold rate of delivery $R_T$ for each content item C remains at 5, there will be a minimum number of 5×100=500 content item deliveries a day. Over T=20 days, the total number of deliveries of all content items will be requested by the content provider 101 represented by N equaling 10,000 will be met. However, the online system will be unable to deliver any content item C at a higher rate than the minimum threshold rate of delivery $R_T$ without exceeding the total number of deliveries of all content items requested by the content provider 101 represented by N.

In alternative embodiments, each content item C may be associated with a weight $W_C$. The delivery rate generation module 112 shown in FIG. 2 may determine the threshold rate of delivery $R_T$ based on the weight $W_C$ associated with the content item C. The weight $W_C$ associated with the content item C may be provided by the content provider 101 based on a policy, the weight $W_C$ may be a measure of the importance of the content item C to the content provider 101, with higher weighted content items requiring more frequent delivery to the client devices 120 and the website 131 of the content publisher 130. The weight $W_C$ associated with the content item C may be a measure of the purpose of the content item C. For example, content items provided for the purpose of delivering hyperlinks to client devices for transactions to be performed by users of the online system 110 may be weighted higher than content items provided for the purpose of building brand awareness. The delivery rate generation module 112 shown in FIG. 2 may determine the threshold rate of delivery $R_T$ based on the weight $W_C$ associated with the content item C as: $R_T=f(W_C)$.

In one embodiment in which the online system 110 is a social networking system, an edge store stores information describing connections between users and other objects, such as content items, on the online system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 110, such as expressing interest in a page on the online system 110, sharing a link with other users of the online system 110, and commenting on posts made by other users of the online system 110. Users and objects within the online system 110 can be represented as nodes in a social graph that are connected by edges stored in the edge store.

In one embodiment, an edge may include various characteristics each representing characteristics of interactions between users, interactions between users and object, or interactions between objects. For example, characteristics included in an edge describe rate of interaction between two users, how recently two users have interacted with each other, the rate or amount of information retrieved by one client about an object, or the number and types of comments posted by a user about an object. The characteristics may also represent information describing a particular object or user. For example, a characteristic may represent the level of interest that a user has in a particular topic, the rate at which the user logs into the online system 110, or information describing demographic information about a user. Each characteristic may be associated with a source object or client, a target object or user, and a characteristic value. A characteristic may be specified as an expression based on values describing the source object or user, the target object or user, or interactions between the source object or user and target object or user; hence, an edge may be represented as one or more characteristic expressions.

The edge store also stores information about edges, such as affinity scores for objects, interests, and other users. Affinity scores, or "affinities," may be computed by the online system 110 over time to approximate a user's affinity for an object, interest, and other users in the online system 110 based on the actions performed by the user. A client's affinity may be computed by the online system 110 over time to approximate a user's affinity for an object, interest, and other users in the online system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store, in one embodiment. Alternatively, each interaction between a user and a specific object is stored as a separate edge. In some embodiments, connections between users may be stored in a client profile store, or the client profile store may access the edge store to determine connections between users.

In one embodiment, the online system 110 identifies stories likely to be of interest to a user through a "newsfeed" presented to the user. A story presented to a user describes an action taken by an additional client connected to the user and identifies the additional user. In some embodiments, a story describing an action performed by a user may be accessible to users not connected to the user that performed the action. The newsfeed manager 210 generates stories for presentation to a user based on information in the client interaction store 202 and in the edge store or may select candidate stories included in the content store 202. One or more of the candidate stories are selected and presented to a user by the newsfeed manager 210.

For example, the newsfeed manager 210 receives a request to present one or more stories to a social networking system user. The newsfeed manager 210 accesses one or more of the client profile store, the content store 202, the client interaction store 203, and the edge store to retrieve information about the identified client. For example, stories or other data associated with users connected to the identified client are retrieved. The retrieved stories or other data is analyzed by the newsfeed manager 210 to identify content likely to be relevant to the identified user. For example, stories associated with users not connected to the identified user or stories associated with users for which the identified user has less than a threshold affinity are discarded as candidate stories. Based on various criteria, the newsfeed manager 210 selects one or more of the candidate stories for presentation to the identified user.

In various embodiments, the newsfeed manager 210 presents stories to a user through a newsfeed, which includes stories selected for presentation to the user. The newsfeed may include a limited number of stories or may include a complete set of candidate stories. The number of stories included in a newsfeed may be determined in part by a user preference included in the client profile store. The newsfeed manager 210 may also determine the order in which selected stories are presented via the newsfeed. For example, the newsfeed manager 210 determines that a user has a highest affinity for a specific user and increases the number of stories in the newsfeed associated with the specific user or modifies the positions in the newsfeed where stories associated with the specific user are presented.

The newsfeed manager 210 may also account for actions by a user indicating a preference for types of stories and selects stories having the same, or similar, types for inclusion in the newsfeed. Additionally, the newsfeed manager 210 may analyze stories received by the online system 110 from various users and obtains information about user preferences or actions from the analyzed stories. This information may be used to refine subsequent selection of stories for newsfeeds presented to various users.

Overall Process

Figure 3:
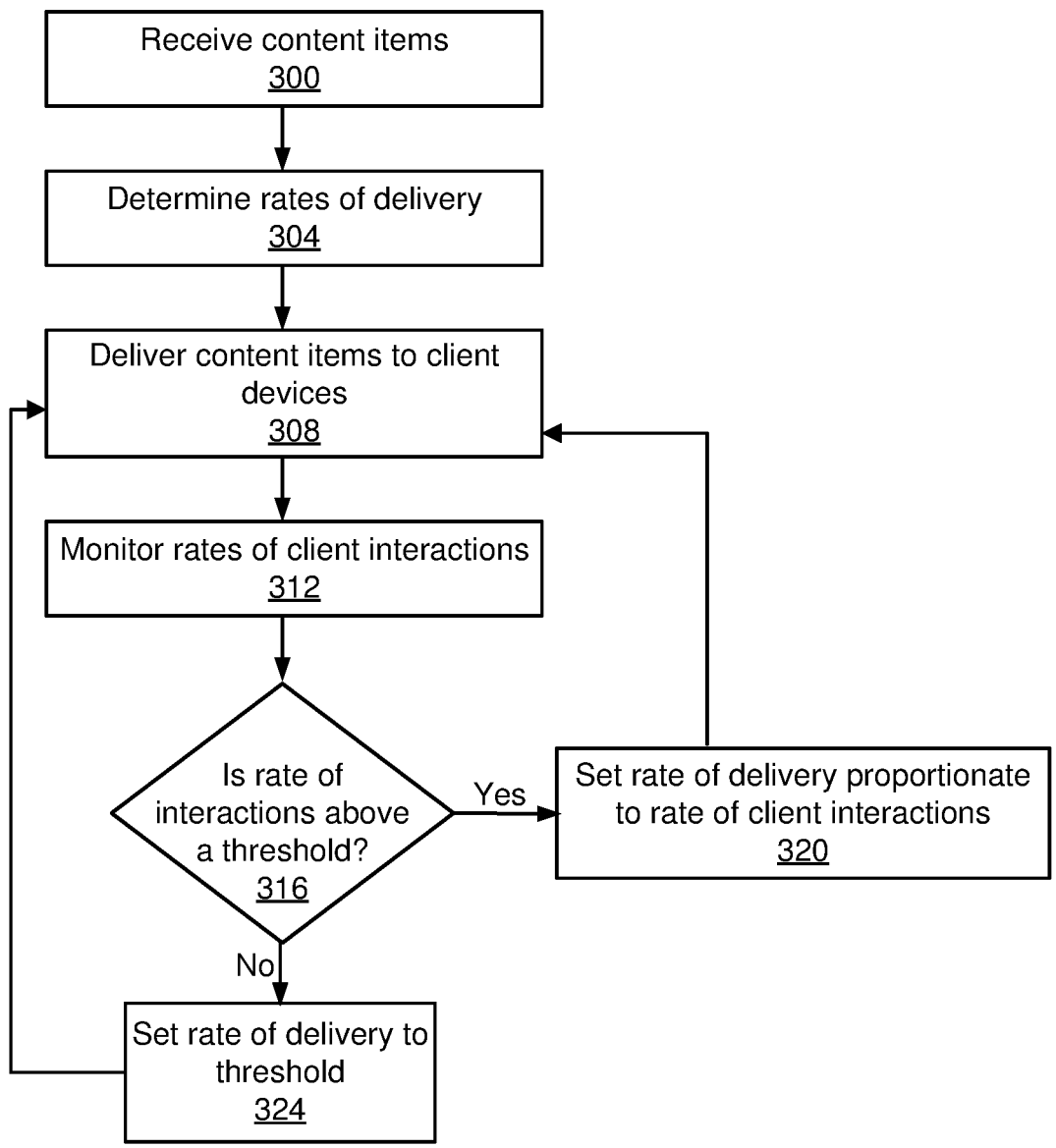
FIG. 3 illustrates a process of delivering content items to client devices of users of the online system, in accordance with an embodiment.

FIG. 3 is a flowchart illustrating an example process of delivering content items to client devices of users of the online system, in accordance with an embodiment. In some embodiments, the process may have different and/or additional steps than those described in conjunction with FIG. 3. Steps of the process may be performed in different orders than the order described in conjunction with FIG. 3. Some steps may be executed in parallel. Alternatively, some of the steps may be executed in parallel and some steps executed sequentially. Alternatively, some steps may execute in a pipelined fashion such that execution of a step is started before the execution of a previous step.

The online system 110 receives 300 content items from a content provider 101 via the external system interface 201, as illustrated and described in detail above in FIGS. 1 and 2. For example, the content provider may provide a set of content items for a particular content campaign, such as an ad campaign for a particular product line. In some embodiments, the content provider may specify a budget for the ad campaign or specify a number of impressions that the content provider is purchasing for the campaign. The online system 110 stores the content items in the content item store 202 for sending to the client devices 120 as well as to the website 131 of the content publisher 130. The delivery rate generation module 112 determines 304 a rate of delivery $R_C$ for each content item C for the online system 110 to deliver the content item C to client devices 120 of users of the online system 110 based on the determined rate of delivery $R_C$. The online system 110 delivers 308 each content item C to client devices 120 of users of the online system 110 during a first time interval based on the determined rate of delivery $R_C$.

The client interaction manager 111 shown in FIG. 2 receives data packets representing client interactions with or related to content items presented to the client devices 120 and the website 131 of the content publisher 130 via the external system interface 201 and populates the client interaction store 203 with information about client interactions. The client interaction manager 111 monitors 312 a rate of client interactions $I_C$ with each content item C during the first time interval in response to the delivery. For example, the client interactions might be the conversions associated with the content item where a user who viewed the content item purchases the product or service shown in the content item or has taken another action that is sought after in the content item (e.g., installed a app, joined a club or event, etc.).

The delivery rate generation module 112 shown in FIG. 2 adjusts the rate of delivery $R_C$ for each content item C for a second time interval occurring after the first time interval, based on the monitored rate of client interactions $I_C$ during the first time interval to maximize the total number of client interactions over all content items: $\Sigma_C I_C$ in the second time interval. The delivery rate generation module 112 determines 316 if the monitored rate of client interactions $I_C$ with each content item C during the first time interval is above a threshold rate of client interactions $I_T$. The delivery rate generation module 112 sets 320 the rate of delivery $R_C$ for each content item C to a value proportionate to the monitored rate of client interactions $I_C$ with the content item C if the monitored rate of client interactions $I_C$ is above the threshold rate of client interactions $I_T$. The delivery rate generation module 112 sets 324 the rate of delivery $R_C$ for each content item C to the threshold rate of delivery $R_T$ if the monitored rate of client interactions $I_C$ is below the threshold rate of client interactions $I_T$. The online system 110 delivers the content items to the client devices 120 and the website 131 of the content publisher 130 during a second time interval based on the adjusted rates of delivery. The rate of delivery continues to be adjusted so that it is a dynamic determination over time since certain content items in the set may become more or less popular over time, or there may be burn out over time on certain content items. If a content provider indicated a particular number of impressions for a campaign or set of content items, instead of dividing the impressions equally, they are divided according to a continually changing performance across the content items over time.

Figure 4:
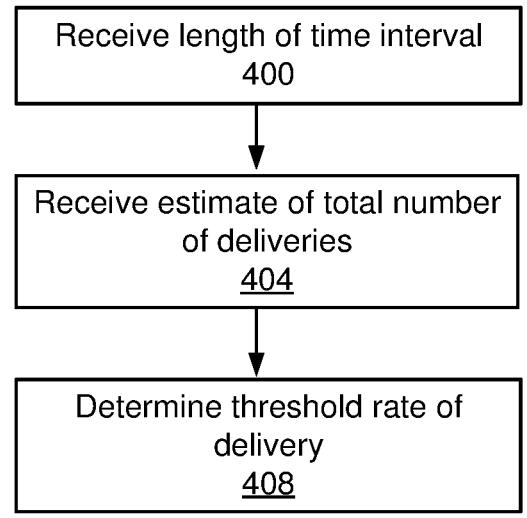
FIG. 4 illustrates a process of determining a threshold rate of delivery and delivering content items to client devices of users of the online system, in accordance with an embodiment.

FIG. 4 is a flowchart illustrating the overall process of determining a threshold rate of delivery and delivering content items to client devices of users of the online system, in accordance with an embodiment. In some embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step.

The client interaction manager 111 receives data packets representing client interactions with content items presented to the client devices 120 and the website 131 of the content publisher 130 via the external system interface 201 and populates the client interaction store 203 with information about client interactions. The client interaction manager 111 monitors 312 a rate of client interactions $I_C$ with each content item C during the first time interval in response to the delivery.

The online system 100 receives 400 a measure of length of a time interval T during which the content items are expected to be delivered. The online system 100 receives 404 an estimate of the total number of deliveries N of content items during the time interval. The delivery rate generation module 112 determines 408 the threshold rate of delivery $R_T$ based on the length of the time interval and the total number of deliveries of content items as $R_T=f(T, N)$.

In an embodiment, the delivery rate generation module 112 uses the threshold rate of delivery $R_T$ in the process illustrated in FIG. 3, for example, for determining 316 if the monitored rate of client interactions $I_C$ with a content item C is above the threshold rate of client interactions $I_T$. The thresholds ensure that no content item is never delivered and no content item is delivered too much such that it takes over the budget of impressions allocated by the content provider or the online system.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method comprising:
   receiving, by a social networking system from a content provider, a plurality of related content items for delivery to users of the social networking system over a period of time;
   determining a respective rate of delivery of each respective related content item of the plurality of related content items to client devices of users of the social networking system;
   providing for delivery the plurality of related content items to the client devices of the users of the social networking system based on each of the determined respective rates of delivery;
   providing, by the social networking system, tracking pixel instructions to a content publisher website for sending to a client device along with webpages accessed by the client device from the content publisher website, the content publisher website providing at least one of the plurality of related content items to the social networking system for delivery;
   responsive to delivering the plurality of related content items to the client devices of users of the social networking system, monitoring a respective rate of client interactions associated with each respective related content item of the plurality of related content items over a portion of the period of time, the monitoring comprising:
      receiving data, based on the tracking pixel instructions, describing one or more client interactions with the content publisher website; and
      identifying one or more social media interactions made with respect to one or more publications generated by users on the social networking system, the one or more publications being linked to the at least one of the plurality of related content items that is provided by the content publisher website;
   for each respective related content item of the plurality of related content items, adjusting the respective rate of delivery based on the monitored rate of client interactions associated with the respective related content item, the monitored rate of client interactions being based on the data describing the one or more client interactions with the content publisher website and the identified one or more social media interactions, the adjusting comprising:
      setting the respective rate of delivery of the related content item to a value proportionate to the respective rate of client interactions associated with the respective related content item if the respective rate of client interactions is above a threshold rate of client interactions, and
      setting the respective rate of delivery of the respective related content item to a threshold rate of delivery if the respective rate of client interactions is below the threshold rate of client interactions; and providing for delivery the plurality of related content items to the client devices of the users of the social networking system based on the adjusted respective rates of delivery.

2. The method of claim 1, wherein the plurality of related content items is delivered based on the determined respective rates of delivery during a first time interval and wherein the plurality of related content items is delivered based on the respective adjusted rates of delivery during a second time interval occurring after the first time interval.

3. The method of claim 1, further comprising:

adjusting the respective rate of delivery of each of the plurality of related content items based on monitored respective rates of client interactions associated with the respective related content item during a first time interval such that the related content items each have different rates of delivery, the adjusting comprising:

setting the respective rate of delivery of the respective related content item to a value proportionate to the respective rate of client interactions associated with the respective related content item during the first time interval if the respective rate of client interactions is above a threshold rate of client interactions, and setting the rate of delivery of the respective related content item to a threshold rate of delivery if the respective rate of client interactions is below the threshold rate of client interactions; and providing for delivery the plurality of related content items to the client devices of the users of the online system based on the adjusted respective rates of delivery during a second time interval occurring after the first time interval.

4. The method of claim 1, wherein the threshold rate of client interactions is a first threshold rate of client interactions and the threshold rate of delivery is a first threshold rate of delivery and wherein adjusting the respective rate of delivery of each of the plurality of related content items further comprises:

setting the respective rate of delivery of the respective related content item to a second threshold rate of delivery if the monitored respective rate of client interactions is above a second threshold rate of client interactions, wherein the second threshold rate of delivery is higher than the first threshold rate of delivery.

5. The method of claim 1, further comprising:

determining the threshold rate of delivery as a value inversely proportionate to the number of related content items in the plurality of content items.

6. The method of claim 1, further comprising:

receiving a measure of length of a time interval during which the plurality of related content items are expected to be delivered;

receiving an estimate of a total number of deliveries of related content items during the time interval, wherein a delivery of a related content item represents an instance of a particular related content item being sent to a client device of a user; and determining the threshold rate of delivery as a value based on the length of the time interval and the total number of deliveries of related content items.

7. The method of claim 5, wherein the threshold rate of delivery is determined as a value proportionate to a ratio of the total number of deliveries of related content items to the length of the time interval.

8. The method of claim 1, wherein each of the plurality of related content items is associated with a weight, the method further comprising:

determining the threshold rate of delivery for each respective related content item as a value proportionate to the weight associated with the respective related content item.

9. The method of claim 1, wherein a client interaction comprises one of:

clicking on a link in a related content item, closing a related content item, sharing a related content item, or performing a transaction associated with a related content item.

10. The method of claim 1, wherein determining the respective rate of client interactions associated with a respective related content item comprises:

determining a weighted aggregate of a plurality of client interactions with the respective related content item.

11. The method of claim 10, wherein the rate of clicking on a link in a related content item is weighted more than the rate of closing the related content item using a close button on a browser of a client device.

12. The method of claim 10, wherein the rate of sharing a related content item from a first client device to a second client device is weighted more than the rate of clicking on a link in the related content item.

13. The method of claim 10, wherein the rate of performing a transaction associated with a related content item is weighted more than the rate of sharing a related content item.

14. A non-transitory computer-readable storage medium comprising instructions executable by a processor, the instructions comprising instructions for:

receiving, by a social networking system from a content provider, a plurality of related content items for delivery to users of the social networking system over a period of time;

determining a respective rate of delivery of each respective related content item of the plurality of related content items to client devices of users of the social networking system;

providing for delivery the plurality of related content items to the client devices of the users of the social networking system based on each of the determined respective rates of delivery;

providing, by the social networking system, tracking pixel instructions to a content publisher website for sending to a client device along with webpages accessed by the client device from the content publisher website, the content publisher website providing at least one of the plurality of related content items to the social networking system for delivery;

responsive to delivering the plurality of related content items to the client devices of users of the social networking system, monitoring a respective rate of client interactions associated with each respective related content item of the plurality of related content items over a portion of the period of time, the monitoring comprising:

receiving data, based on the tracking pixel instructions, describing one or more client interactions with the content publisher website; and identifying one or more social media interactions made with respect to one or more publications generated by users on the social networking system, the one or more publications being linked to the at least one of the plurality of related content items that is provided by the content publisher website;

for each respective related content item of the plurality of related content items, adjusting the respective rate of delivery based on the monitored rate of client interactions associated with the respective related content item, the monitored rate of client interactions being based on the data describing the one or more client interactions with the content publisher website and the identified one or more social media interactions, the adjusting comprising:

setting the respective rate of delivery of the related content item to a value proportionate to the respective rate of client interactions associated with the respective related content item if the respective rate of client interactions is above a threshold rate of client interactions, and setting the respective rate of delivery of the respective related content item to a threshold rate of delivery if the respective rate of client interactions is below the threshold rate of client interactions; and providing for delivery the plurality of related content items to the client devices of the users of the social networking system based on the adjusted respective rates of delivery.

15. The non-transitory computer-readable storage medium of claim 14, wherein the plurality of related content items is delivered based on the determined respective rates of delivery during a first time interval and wherein the plurality of related content items is delivered based on the adjusted respective rates of delivery during a second time interval occurring after the first time interval.

16. The non-transitory computer-readable storage medium of claim 14, wherein the threshold rate of client interactions is a first threshold rate of client interactions and the threshold rate of delivery is a first threshold rate of delivery and wherein adjusting the respective rate of delivery of each of the plurality of related content items further comprises:

setting the respective rate of delivery of the respective related content item to a second threshold rate of delivery if the monitored respective rate of client interactions is above a second threshold rate of client interactions, wherein the second threshold rate of delivery is higher than the first threshold rate of delivery.

17. The non-transitory computer-readable storage medium of claim 14, further comprising instructions for:

receiving a measure of length of a time interval during which the plurality of related content items are expected to be delivered;

receiving an estimate of a total number of deliveries of related content items during the time interval, wherein a delivery of a related content item represents an instance of a particular related content item being sent to a client device of a user; and determining the threshold rate of delivery as a value based on the length of the time interval and the total number of deliveries of related content items.

18. The non-transitory computer-readable storage medium of claim 14, wherein the threshold rate of delivery is determined as a value proportionate to a ratio of the total number of deliveries of related content items to the length of the time interval.

19. The non-transitory computer-readable storage medium of claim 14, wherein each of the plurality of related content items is associated with a weight, the method further comprising:

determining the threshold rate of delivery for each respective related content item as a value proportionate to the weight associated with the respective related content item.

* * * * *